United States Patent [19]

Freeman et al.

[11] 4,225,342
[45] Sep. 30, 1980

[54] TREATMENT OF ZINC PLANT LEACH RESIDUES FOR RECOVERY OF THE CONTAINED METAL VALUES

[75] Inventors: George M. Freeman, Montreal; David E. Nightingale, Timmins, both of Canada

[73] Assignee: Texasgulf Inc., Stamford, Conn.

[21] Appl. No.: 77,714

[22] Filed: Sep. 21, 1979

[51] Int. Cl.³ ..................... C22B 11/06; C22B 25/04; C22B 13/04
[52] U.S. Cl. ........................................ 75/109; 75/116; 75/118 R; 75/120; 75/121; 423/45; 423/91
[58] Field of Search ..................... 75/109, 116, 118 R, 75/120, 121; 423/45, 91

[56] References Cited

U.S. PATENT DOCUMENTS

| | | | |
|---|---|---|---|
| 3,493,365 | 2/1970 | Pickering et al. | 75/101 R |
| 3,510,414 | 5/1970 | Orlandini et al. | 204/119 |
| 3,652,264 | 3/1972 | Bodson | 75/115 X |
| 3,684,490 | 8/1972 | Steintreit | 75/101 R |
| 3,691,038 | 9/1972 | Von Roepenack et al. | 75/120 X |
| 3,743,501 | 7/1973 | Cusanelli et al. | 75/109 |
| 3,781,405 | 12/1973 | Allan et al. | 423/142 |
| 3,937,658 | 2/1976 | Jackson | 423/146 X |
| 3,959,437 | 5/1976 | Rastas et al. | 423/46 X |
| 3,985,857 | 10/1976 | Menendez et al. | 423/106 |
| 4,054,638 | 10/1977 | Dreulle et al. | 423/39 |
| 4,063,933 | 12/1977 | Peters | 75/118 R X |
| 4,071,421 | 1/1978 | Masters et al. | 204/96 |
| 4,128,617 | 12/1978 | DeGuire et al. | 423/106 |

Primary Examiner—G. Ozaki
Attorney, Agent, or Firm—Denis A. Polyn

[57] ABSTRACT

A process for treating zinc plant leach residues for the recovery of the lead, silver, and tin values contained therein is disclosed. The process includes the treatment of the zinc plant residue with concentrated sulphuric acid followed by water leaching and other hydrometallurgical steps to separately recover the lead, silver and tin.

31 Claims, 1 Drawing Figure

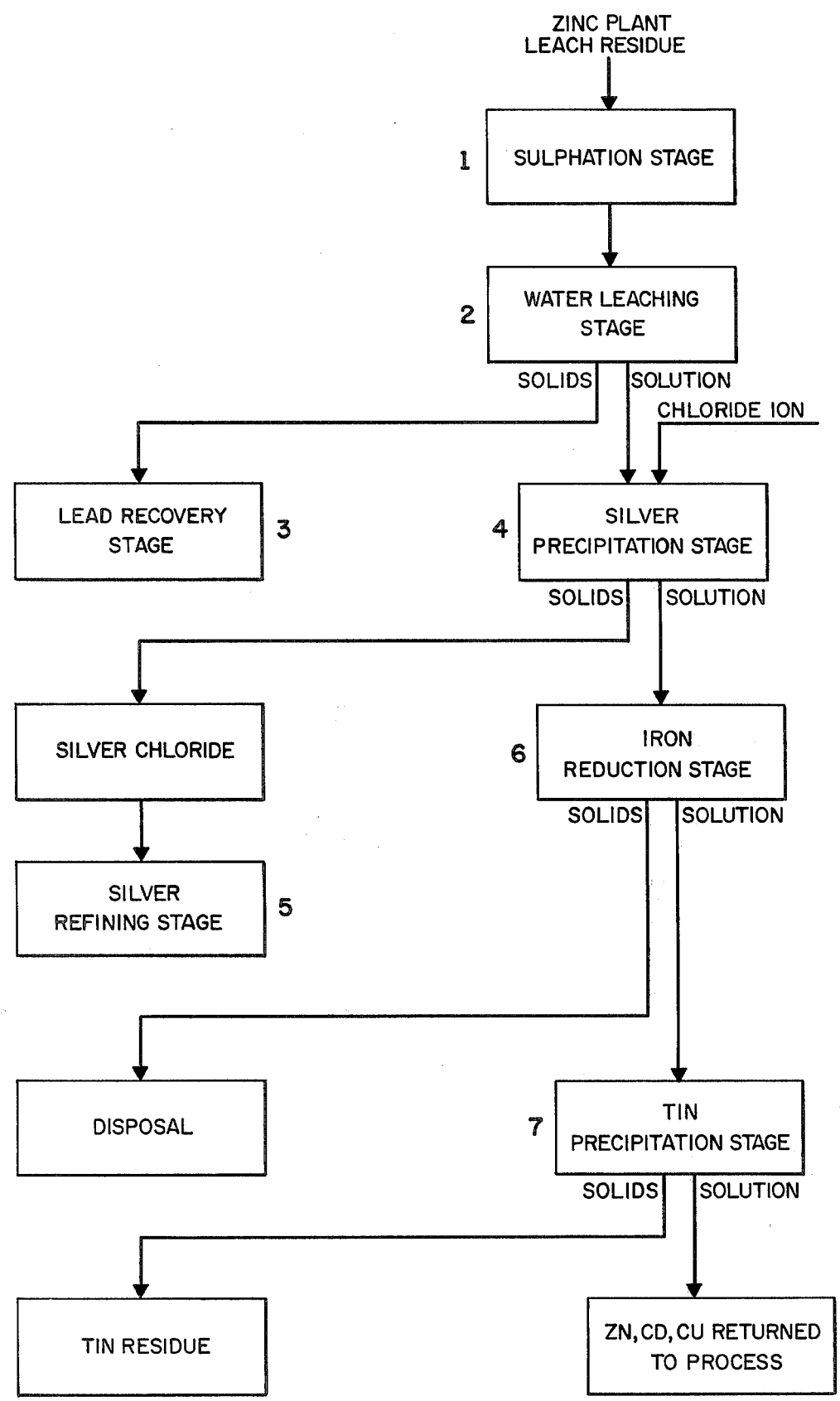

TREATMENT OF ZINC PLANT LEACH RESIDUES FOR RECOVERY OF THE CONTAINED METAL VALUES

This invention relates to a process for treating leach residues for the recovery of contained metal values, and more particularly, is directed to a process for recovering lead, silver and tin from zinc plant leach residues.

An increased recovery of zinc in electrolytic zinc plant is accomplished by a high acid leach process. This acid leach process is universally designed for the maximum extraction of zinc and as a consequence, elements such as copper, cadmium and iron are, to a large extent, simultaneously extracted. These leach processes are not, however, designed to extract minor elements such as, silver, tin, germanium, selenium, etc. Rather they are designed to leave elements which are toxic to the electrowinning of zinc in the leach residues. These residues therefore contain not only minor elements of commercial value but valuable amounts of zinc, copper and cadmium which are not fully extracted.

In the past the leach residues from zinc recovery plants have been shipped to independent smelters for recovery of the metal values contained therein. The cost of shipping the raw residue substantially detracts from the intrinsic value of the residue. The process of the present invention allows for the recovery of the lead, silver and tin metals contained in the zinc leach residue, as well as the zinc, cadmium and copper metals which may be recycled to the zinc plant for further processing.

The present invention relates to a method for the extraction of lead, silver and tin from zinc plant leach residues. In accordance with the present invention zinc plant leach residues are first treated with concentrated sulphuric acid to convert the metal values contained therein to their water-soluble sulphate forms. These sulphate forms are then water leached from the acid mixture resulting in the separation of the insoluble fraction from the leach liquor. The insoluble component at this stage is an upgraded lead bearing residue which after separation from the leach solution is washed and the lead recovered by standard metallurgical procedures. The leach solution is then treated with chloride ion to precipitate the silver.

After the silver is removed by filtration the leach solution is treated with zinc calcine under acid conditions to reduce the iron content to a level compatible for the removal of tin as metastannic acid, co-precipitated with the residual iron in solution as collector/carrier. The resulting iron-tin precipitate is then treated with mild acid to increase the tin concentration.

The leach solution, after removal of the iron-tin precipitate, is returned to the zinc plant where recovery of the contained zinc, copper and cadmium is accomplished.

Accordingly, it is an object of the process of the present invention to recover lead, silver and tin from zinc plant leach residues.

Another object of the process of the present invention is to provide for the recovery of additional zinc, copper and cadmium from zinc plant leach residues.

Still other objects and advantages of the present invention will be apparent from the specification and attached drawing.

The process of the present invention comprises treating a zinc plant leach residue containing zinc, cadmium, copper, lead, silver and tin to recover the lead, silver and tin in relatively concentrated form while returning the residual leach solution, containing the zinc, cadmium and copper, to the zinc plant for additional treatment.

As shown by the flow chart depicted in the drawing the process comprises seven basic steps or stages, those being: a sulphation stage, a water leaching stage, a lead recovery stage, a silver precipitation stage, a silver refining stage, an iron precipitation stage and a tin precipitation stage.

For the purpose of clarity the process of the present invention will be described in reference to the above listed steps.

SULPHATION STAGE

Referring to the drawing the zinc plant leach residue is introduced to a sulphation chamber 1, where it is treated with a sulphuric acid solution having a concentration of about 90% to about 100% by weight of acid. The sulphation is conducted at a temperature of from 100° C. to 700° C. for a time period of about ½ hour to about 24 hours. The temperature and time depend on the type of sulphation vessel used, and the priority given to metal recoveries. The acid treatment produces a relatively dry cake in which the bulk of the metal values contained therein have been converted to their sulphate forms. During the sulphation stage some acidic gases are given off. These gases are removed in a scrubber, prior to venting the other gases to the atmosphere.

Generally the leach residues from high acid leach zinc recovery processes contain zinc, cadmium and copper in the form of insoluble ferrites having the general formula, $XOFe_2O_3$, wherein X is selected from the group consisting of Zn, Cu and Cd. The silver and lead in the leach residue occur as chlorides or sulphates. All are insoluble with the exception of silver sulphate which is slightly soluble. Tin occurs mainly as an insoluble oxide. The sulphation of the leach residue converts the metal ferrites to soluble metal sulphates. The conversion of the metal ferrites to their soluble sulphate forms is represented by the following general formula, wherein X represents a metal selected from the group consisting of Zn, Cu and Cd.

$$XOFe_2O_3 + 4H_2SO_4 \xrightarrow{Heat} XSO_4 + Fe_2(SO_4)_3 + 4H_2O.$$

Some of the silver chloride and lead chloride are also converted to sulphates, i.e.:

$$2AgCl + PbCl_2 + 2H_2SO_4 \xrightarrow{Heat} Ag_2SO_4 + PbSO_4 + 4HCl$$

A portion of the tin that exists as tin dioxide is converted to tin sulphate, i.e.:

$$SnO_2 + 2H_2SO_4 \rightarrow Sn(SO_4)_2 + 2H_2O$$

One of the most important variables in the present invention is the amount of acid used in the sulphation stage. Efficient operation requires that the minimum amount of acid necessary for complete reaction be used. Theoretical acid addition has been calculated to be 3.5 tons of acid/ton of iron, and sulphations done at less than this acid addition have been found to give poor results. Generally acid ratios of about 4.0 to 5.0 tons of acid/ton of iron are sufficient while an acid ratio of 4.2 tons acid/ton of iron is preferred.

As with the addition of acid, the temperature at which the sulphation is accomplished is also important. Sulphations carried out at about 200° C. were successful while temperatures of about 400° C. resulted in only slightly increased tin recovery.

The duration of sulphation is a less important variable than the amount of acid or the temperature at which sulphation is carried out. Generally, sulphation times of about 8 to about 24 hours have been found to be sufficient for a large mass sulphation, whereas thin film sulphation required a duration of about ½ to 1 hour.

WATER LEACHING STAGE

Subsequent to the sulphation stage, the resulting dry cake, in which the bulk of the metal values have been converted to their sulphate forms, is introduced to the water leaching stage 2. The cake is water leached using a weight of demineralized water to weight of dry cake ratio of approximately 3:1. It has been found that good results are obtained using leach water having a temperature of from ambient temperature to about 100° C., the preferred being about 80° C. for approximately 15 min. to 2 hours. Normally the leaching step is complete within from about ½ to 1 hour.

LEAD RECOVERY STAGE

After leaching is complete the pulp is separated from the leach solution. The pulp, which contains lead and small amounts of silver, is then transferred to the lead recovery stage 3 where it is washed to remove any of the soluble metal components left behind by the water leach. Generally one wash is sufficient. The differences in recovery using two as opposed to one wash are small, and recovery with one wash may be improved by simply using additional water. A good indication that the pulp has been sufficiently washed is that the $Fe^{+3}$ concentration in the last wash is below 3 g/l; the acid concentration below 5 g/l; the iron in the residue is below 2% and the water soluble zinc below 0.5%.

Subsequent to washing, the pulp, which contains the insoluble lead and some silver, may be shipped to independent smelters for further refining.

SILVER PRECIPITATION STAGE

The leach solution after separation from the lead pulp is introduced to the silver precipitation stage 4, where it is treated with chloride ion to precipitate insoluble silver chloride. The chloride ion is introduced such that a chloride ion concentration of about 200 ppm is obtained. It has been found that the silver content in the water leach solution is lowered from about 230 ppm to about 10 ppm using NaCl for silver recovery. Note that the concentration of the chloride ion must be sufficient to precipitate all of the silver without being present in excessive amounts which would interfere with the zinc recovery process when the residual leach solution is returned to the zinc plant.

The addition of the chloride ions to the leach solution after the separation of the lead residue allows for the production of separate lead and silver residues. However, in a second embodiment of the present invention the chloride ions are introduced to the water leach prior to its contact with the dry sulphated cake. Using a leach water containing 200 ppm chloride ions produces a lead/silver residue having a typical assay of about 114 oz/ton Ag, 21% Pb, 1% Sn, 0.4% Zn, 0.85% Fe, 0.1% Cu and 0.3% Cd. The resultant leach solution assay is about 38 g/l Zn, 64 g/l Fe, 2 g/l Cu, 0.3 g/l Cd and 2 g/l Sn. This gives a recovery in the residue of 100% Ag, 100% Pb, 32% Sn, 0.5% Zn, 0.3% Fe, 4% Cu and 36% Cd.

In either of the above embodiments the temperature of the leach solution should be maintained at between ambient temperature and 100° C. preferably about 80° C.

SILVER REFINING

After the precipitation of the silver in the form of silver chloride, the silver chloride is separated from the leach solution by filtration and introduced to the silver refining stage 5. The silver chloride residue is a high grade silver residue containing about 65% Ag. This silver residue may be further refined using standard metallurgical techniques as for example, electromotive reduction.

IRON PRECIPITATION STAGE

After silver precipitation the leach solution is introduced to stage 6 where the iron content is reduced to a level compatible for the removal of tin. The iron precipitation reaction is performed by adjusting the pH of the solution to between about 1 and 2, preferably 1.8, using sodium carbonate and/or zinc calcine at a temperature of about 90° C. to 95° C. Subsequent to pH adjustment a sufficient quantity of soda ash ($Na_2CO_3$) or zinc calcine (consisting essentially of zinc and oxygen) is added to the leach solution to reduce the iron content of about 2 g/l. Generally, the iron precipitation rate using the above parameters is about 7 g/l/hr.

TIN PRECIPITATION

Subsequent to the precipitation of the iron, the leach solution is separated from the residue and the residue discarded. The resulting solution is then introduced to tin precipitation stage 7. During this stage the tin sulphate contained in the leach solution is hydrolyzed at a pH of about 4.5 to 5 using caustic soda or sodium carbonate and precipitated out as metastannic acid, $Sn(OH)_4$. Note that the metastannic acid is co-precipitated with the residual iron in solution as collector/carrier. Subsequent to precipitation, the iron-tin residue is separated from the leach solution. The iron-tin precipitation is then treated to increase the tin concentration by redissolving the iron in mild acid. Subsequent to the redissolving of the iron the tin concentration is increased to about 35% by weight of the residue. At this point the tin residue is acceptable for sale to outside converters.

In still another embodiment zinc dust is used as a combination reduction/neutralization agent. In this embodiment from 2 to 2.5 times the amount of zinc required to reduce the iron to the ferrous state and the copper to the metallic state is added to the leach solution. The tin residue thus obtained is then releached with sulphuric acid at a pH of approximately 1.5 producing a tin recovery of about 87%.

After removal/recovery of the iron and tin the residual leach solution which contains zinc, cadmium and copper may be recycled to the zinc plant for further processing.

The foregoing process may be illustrated by the following example.

100 tons of zinc plant leach residue having the following assay:

| Metal | Assay | Distribution |
|---|---|---|
| Zn | 13.9% | 100.0% |
| Fe | 20.3% | 100.0% |
| Cu | 0.69% | 100.0% |
| Cd | 0.09% | 100.0% |
| Ag | 26.1 o/t | 100.0% |
| Pb | 5.04% | 100.0% |
| Sn | 0.88% | 100.0% | was sulphated using 81.2 tons of concentrated sulphuric acid for 16 hours at a temperature of about 200° C. The weight ratio of the sulphuric acid to the iron content of the residue was about 4.2:1. The sulphated cake was then water leached using 660,000 lbs. of demineralized water (i.e., 66,000 imperial gallons). The temperature of the leach water was about 80° C. Following the leach step the solid residue containing the insoluble lead and silver metals was separated from the leach solution.

The leach solution had the following assay:

| Metal | Assay | | Distribution |
|---|---|---|---|
| Zn | 45.9 | g/l | 99.0% |
| Fe | 66.2 | g/l | 97.8% |
| Cu | 2.25 | g/l | 98.0% |
| Cd | 0.29 | g/l | 95.8% |
| Ag | 6.40 | o/t | 74.3% |
| Pb | 0.0 | g/l | 0.0% |
| Sn | 1.73 | g/l | 59.1% |

The residue had the following assay:

| Metal | Assay | Distribution |
|---|---|---|
| Zn | 0.62% | 1.0% |
| Fe | 1.99% | 2.2% |
| Cu | 0.06% | 2.0% |
| Cd | 0.02% | 4.2% |
| Ag | 29.95 oz/ton | 25.7% |
| Pb | 22.5% | 100.0% |
| Sn | 1.61% | 40.9% |

The leach solution was then treated with 200 lbs of technical grade NaCl to produce a chloride ion content of about 200 ppm. The silver was recovered as silver chloride. It was found that the assay of the residue contained about 65% or 3,036 ounces (Troy) of silver. The leach solution had the following assay:

| Metal | Assay | | Distribution |
|---|---|---|---|
| Zn | 45.9 | g/l | 99.0% |
| Fe | 66.2 | g/l | 97.8% |
| Cu | 2.25 | g/l | 98.0% |
| Cd | 0.29 | g/l | 95.8% |
| Sn | 1.73 | g/l | 59.1% |

The leach solution was next treated to reduce the iron content using sodium carbonate and calcine in a sodium jarosite precipitation process. Subsequent to neutralization the iron content was reduced to 2.0 g/l by the addition of 34.9 tons of zinc calcine. The solution was then tested and found to have the following assay:

| Metal | Assay | | Distribution |
|---|---|---|---|
| Zn | 103.0 | g/l | 93.4% |
| Fe | 2.0 | g/l | 2.5 |
| Cu | 2.50 | g/l | 87.9% |
| Cd | 0.55 | g/l | 88.3% |

-continued

| Metal | Assay | | Distribution |
|---|---|---|---|
| Sn | 1.48 | g/l | 78.0% |

Subsequent to iron precipitation the tin sulfate was hydrolyzed at a pH of about 4.7 such that it precipitated out as metastannic acid. The precipitated residue had the following assay:

| Metal | Assay | Distribution |
|---|---|---|
| Zn | — | 2.8% |
| Fe | — | 2.0% |
| Cu | — | 2.5% |
| Sn | 7.12% | 78.0% |

The residual leach solution could then be recycled to the zinc plant process for recovery of the remaining zinc and copper. The residual leach solution contained zinc, iron and copper in the following distribution:

| Metal | Distribution |
|---|---|
| Zn | (90.6%) |
| Fe | (0.5%) |
| Cu | (85.3%) |

It will be apparent to workers skilled in this art that the foregoing process, while described with respect to certain preferred and exemplary materials and conditions, is subject to numerous other variations and alternations easily ascertainable from the description contained herein without departing from the scope and spirit of the invention as defined by the appended claims.

What is claimed is:

1. A process for the recovery of lead, silver and tin from zinc plant leach residues, comprising the steps of:
    (a) sulphating the zinc plant leach residue to form a dry cake wherein the bulk of the metal values contained therein are in their sulphate form;
    (b) water leaching the silver and tin from the sulphated cake;
    (c) separating the insoluble lead residue from the water leach solution;
    (d) recovering the silver from the leach solution by precipitation;
    (e) treating the leach solution to reduce the iron content; and
    (f) recovering the tin contained in the residual leach solution by precipitation.

2. The process of claim 1 wherein the zinc plant leach residue is sulphated using a sulphuric acid solution having an acid concentration of from about 90% to about 100% by weight.

3. The process of claim 2 wherein about 4.0 to about 5.0 tons of sulphuric acid per ton of iron contained in the zinc plant residue is employed in sulphation.

4. The process of claim 2 wherein about 4.2 tons of sulphuric acid per ton of iron contained in the zinc plant leach residue is employed in sulphation.

5. The process of claim 2 wherein the sulphation is conducted at a temperature of from about 150° C. to about 400° C. for a period of time ranging from ½ hour to about 24 hours.

6. The process of claims 2 or 3 wherein the sulphation is conducted at 200° C. for about 16 hours.

7. The process of claim 2 wherein the weight of water to weight of dry cake ratio employed in water leaching is about 3:1.

8. The process of claim 7 wherein the water is demineralized water.

9. The process of claim 2 wherein water leaching is conducted at about ambient temperature to about 100° C. for about ½ to 2 hours.

10. The process of claim 2 wherein water leaching is conducted at about 80° C. for about ½ hour to 1 hour.

11. The process of claim 2 wherein the insoluble lead residue is separated from the water leach solution by filtration.

12. The process of claim 11 wherein the insoluble lead residue after filtration is washed with sufficient quantities of water to remove any soluble metal components not removed by said water leaching.

13. The process of claim 11 wherein the insoluble lead residue is washed until the $Fe^{+3}$ concentration of the wash water is below 3 g/l, the sulphuric acid concentration is below 5 g/l and the water soluble zinc below 0.5%.

14. The process of claim 11 wherein the insoluble lead residue is washed such that the iron content in said residue is below 2%.

15. The process of claim 2 wherein the silver contained in the leach solution is recovered by precipitation using chloride ions.

16. The process of claim 15 wherein the chloride ion is introduced in the form of sodium chloride.

17. The process of claim 16 wherein the chloride ions are introduced to the leach water prior to leaching.

18. The process of claim 16 or 17 wherein sufficient sodium chloride is introduced to the leach solution to raise the chloride ion content to at least 200 ppm.

19. The process of claim 15 wherein the silver content of the leach solution is reduced from about 230 ppm to about 10 ppm using sodium chloride to precipitate said silver as silver chloride.

20. The process of claim 2 wherein the iron content of the leach solution is reduced to about 2 g/l prior to the recovery of the tin.

21. The process of claim 20 wherein the iron content of the leach solution is reduced by the addition of zinc calcine at a pH of about 1 to 2 and a temperature of about 90° C. to about 95° C.

22. The process of claim 21 wherein the pH is about 1.8.

23. The process of claim 20 wherein the iron content of the leach solution is reduced by the addition of soda ash ($Na_2CO_3$) at a pH of about 1 to 2 and a temperature of about 90° C. to about 95° C.

24. The process of claim 20 wherein the iron reduction rate is about 7 g/l/hr.

25. The process of claim 2 wherein the tin contained in the residual leach solution is precipitated as metastannic acid at pH of about 4.5 to 5.

26. The process of claim 25 wherein the metastannic acid is co-precipitated with the residual iron in solution as collector/carrier.

27. The process of claim 2 wherein the tin is precipitated using zinc dust.

28. The process of claim 27 wherein 2 to 2.5 times the amount of zinc dust needed to reduce the iron contained in the residual leach solution to the ferrous state and the copper contained therein to the metallic state is added to said residual leach solution.

29. A process for the recovery of lead, silver and tin from zinc plant leach residue, comprising the steps of:
(a) sulphating the zinc plant residue with sulphuric acid at a temperature of about 200° C. for about 16 hours to form a dry cake wherein the metal values contained therein are in their sulphate form;
(b) water leaching the sulphated cake at about 80° C. for approximately ½ to 1 hour;
(c) separating the insoluble lead residue from the water leach solution by filtration;
(d) increasing the chloride ion content of the leach solution using sodium chloride to about 200 ppm to precipitate the silver as silver chloride and separating said silver chloride from the leach solution by filtration;
(e) reducing the iron content of the leach solution to about 2 g/l by the addition of zinc calcine at a pH of about 1.8 and a temperature of about 90° C. to about 95° C.;
(f) recovering the tin contained in the residual leach solution by adjusting the pH of said solution to about 4.5 to 5 such that the tin is precipitated as metastannic acid.

30. The process of claim 29 wherein about 4.2 tons of sulphuric acid per ton of iron contained in the zinc plant leach residue is employed in the sulphation.

31. The process of claim 30 wherein the weight of water to weight of dry cake ratio employed in the water leaching is about 3:1.

* * * * *